United States Patent
Buchanan et al.

[15] 3,704,458
[45] Nov. 28, 1972

[54] COMBINATION TRANSMISSION FLUID MONITOR AND FILTER

[72] Inventors: Wilbert Bernard Buchanan, Paulsboro; Leon Haws, Wrightstown, both of N.J.

[73] Assignee: Lorenzo Marini, Burlington, N.J.; by said Buchanan and Haws

[22] Filed: Jan. 29, 1971

[21] Appl. No.: 110,994

[52] U.S. Cl. .......................... 340/239 F, 200/81.9 R
[51] Int. Cl. ............................................. G08b 21/00
[58] Field of Search ....... 340/239 F; 210/85, 90, 440, 210/443; 200/81.9 R

[56] References Cited

UNITED STATES PATENTS 2,369,857  2/1945  Russell et al. ........... 210/440 X
2,529,775  11/1950  Maddox ................. 200/81.9 R
2,747,042  5/1956  Zimmerman .......... 200/81.9 R Primary Examiner—John W. Caldwell
Assistant Examiner—Daniel Myer
Attorney—Karl L. Spivak

[57] ABSTRACT

A combination transmission fluid monitor and filter installable on the transmission fluid cooler outlet line and including a replaceable filter contained within a body. A normally open, pressure responsive switch installs in a fitting communicating with the interior of the filter body and is provided with means to automatically close the switch upon sensing the presence of low transmission fluid pressure.

1 Claim, 5 Drawing Figures

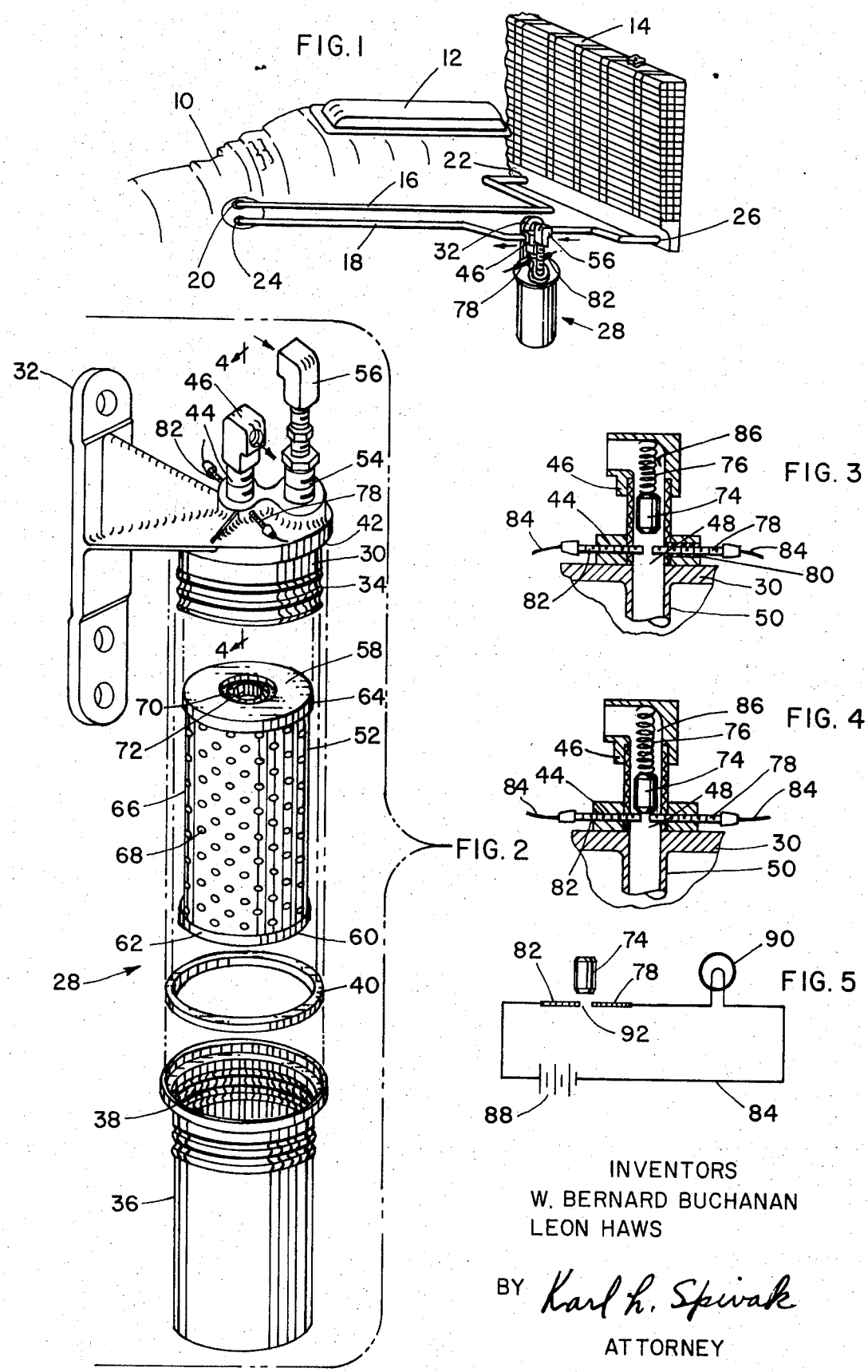

COMBINATION TRANSMISSION FLUID MONITOR AND FILTER

BACKGROUND OF THE INVENTION

The present invention relates to the general field of automotive equipment and more particularly, is directed to a transmission fluid monitor and filter operable to both filter the transmission fluid and also to automatically detect and warn of low transmission fluid pressure.

Automatic transmissions have become widely accepted for use with automobiles and various types of commercial automotive equipment and transmissions of various manufacture have become well known in the art. Transmission fluid is required in the operation of this equipment and it is the usual practice to effect fluid cooling by providing transmission fluid inlet and outlet connections to the automotive radiator system to thereby continuously cool the fluid during all periods of engine operation. Experience has proved that it has been common to lose large quantities of transmission fluid from the automatic transmission, especially after periods of considerable wear. It has been found that fluid has escaped from the system through leakage at the transmission seals, fittings, damaged tubing, and similar areas subject to wear. Operation of the transmission with insufficient available fluid could result in serious consequences including complete transmission burn out.

It has been the usual practice in the past to measure the amount of automatic transmission fluid in the system through the use of a dip stick carried in a channel communicating with the transmission oil reservoir. Thus, by removing the dip stick and measuring the depth of fluid, it has been possible to determine the extent of any possible leakage by noting the low level reading on the gauge. The prior art method of checking for sufficient fluid has generally been satisfactory but suffers from serious drawbacks. For instance, most automobile owners do not take the time or effort to actually check the dip stick to determine the transmission fluid level. Under these circumstances, it is possible to extensively damage a transmission by operation with insufficient transmission fluid available. The dip stick method of measuring is further deficient in that it is incapable of measuring oil pressure which may be low from reasons other than low transmission fluid level. For instance, a clogged screen within the transmission could result in obstructions to the built-up of sufficient pressures for proper lubrication within the transmission even though a dip stick reading would indicate a full level of fluid.

SUMMARY OF THE INVENTION

The present invention seeks to overcome the shortcomings of the prior art transmission fluid measuring devices by providing a combination compact transmission fluid monitor and transmission fluid filter which is installable on the transmission cooler outlet line from the radiator. By providing a switch that is automatically responsive to the presence of low oil pressure within the transmission no matter whether caused by the leakage of fluid or mechanical failure, a visible signal can be automatically generated to thereby alert the driver without the need for raising the hood and checking the transmission dip stick. The device additionally serves to provide a readily replaceable filter to maintain the transmission fluid in a clean condition to thus prevent clogging of internal devices which may result in low fluid pressure.

It is therefore an object of the present invention to provide an improved combination transmission fluid monitor and filter of the type set forth.

It is another object of the present invention to provide a combination transmission fluid monitor and filter that is easily installable on the cooler outlet tubing of both new and existing transmissions.

It is another object of the present invention to provide a novel combination transmission fluid monitor and filter including a readily replaceable filter element.

It is another object of the present invention to provide a novel combination transmission fluid monitor and filter incorporating an automatic, pressure responsive switch which is wired to visually and automatically indicate a low pressure condition to the driver.

It is another object of the present invention to provide a combination transmission fluid monitor and filter that is inexpensive in manufacture, rugged in construction and trouble-free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

BRIEF DESCRIPTION OF THE DRAWINGS

FIG. 1 is a perspective view showing the invention installed upon the cooler line to an automotive transmission.

FIG. 2 is an enlarged, perspective, exploded view of the invention.

FIG. 4 is a cross sectional view taken along Line 4—4 FIG. 1, looking in the direction of the arrows and showing the switch in closed position.

FIG. 3 is a view similar to FIG. 4 showing the switch in open position.

FIG. 5 is a schematic electrical diagram of the operating circuit.

DESCRIPTION OF THE PREFERRED EMBODIMENT OF THE INVENTION

Although specific terms are used in the following description for the sake of clarity, these terms are intended to refer only to the particular structure of our invention selected for illustration in the drawings and are not intended to limit or define the scope of the invention.

Referring now to the drawings, we show in FIG. 1 an automatic automotive transmission 10 operating in conjunction with an internal combustion engine 12 in well known manner. A water cooled radiator 14 of usual design cools the transmission fluid by means of the connecting tubes 16, 18 which communicate between the respective transmission outlet connection 20 and the radiator cooler inlet connection 22 and the transmission inlet connection 24 and the radiator cooler outlet connection 26. The combination monitor and filter device 28 connects in series with the tubing from the cooler outlet 26 and connects into the system in a manner to be responsive to the presence of low fluid pressure.

Referring now to FIG. 2, the monitor and filter device 28 is illustrated comprising a cover 30 which integrally connects to a mounting bracket 32 to secure the device in position upon the automobile construction in well known manner to prevent any strain or vibration to the connecting tube 18. The cover 30 terminates downwardly in an exteriorly threaded section 34 to receive the filter body 36 in removable engagement. The filter body 36 terminates upwardly in an interiorly threaded section 38 for easily removable engagement upon the cover threaded section 34 to facilitate access to and replacement of the filter element in well known manner. A ring gasket 40 interposes between the top of the filter body 36 and the overhanging flange section 42 to provide a leak proof connection between the filter body 36 and the cover 30 when the interior threaded section 38 threadedly engages upon the external threaded section 34.

The cover is provided with a concentric threaded boss 44 which threadedly receives the angular outlet fitting 46 therein in the usual manner. The cover is drilled to provide an axial opening 48 which upwardly communicates with the threaded boss 44 and downwardly terminates in a hollow cylindrical stub 50 for interaction with the filter element 52 as hereinafter more fully set forth. The cover 30 is provided with a second threaded boss 54 which is positioned near the outer periphery thereof for introduction of untreated oil into the monitor and filter unit 28. A second angular fitting 56 threadedly engages upon the boss 54 in well known manner to provide a leakproof inlet oil connection. The cover 30 is drilled at the boss 54 to provide an oil inlet path (not shown) through the cover, to peripherally impinge upon the filter material in spaced juxtaposition from the central axis of the unit.

As illustrated, the filter element 52 is generally cylindrically formed having an oil impervious cap 58 and an oil impervious bottom 60. The bottom 60 and cap 58 are provided with peripherally depending flanges 62, 64 to cooperate in securing an oil impervious filter material cover 66 therebetween. The cover 66 is provided with a plurality of oil passage openings 68 to permit untreated transmission fluid to travel from the boss 54 through the opening 68 for treatment by the cartridge filtering material (not shown) which is retained within the cover 66.

A concentric tubular sleeve 70, provided with openings or other means to permit oil passage therethrough, axially depends through the cover 58 and terminates at the filter element bottom 60. The sleeve 70 connects to the bottom 60 in a closed end and to the filter element cap 58 in an oil passage opening 72. The filter element opening 72 overfits the axially aligned, cylindrical stub 50 which depends from the cover 30 in a substantially oil tight junction to thereby direct threated oil through the axially aligned opening 48 and the boss 44 to exit the filter device 28 through the angular outlet fitting 46. It will be observed that untreated oil (not shown) is peripherally applied to the filter element cover 66 through the angular inlet fitting 56 which is positioned near the outer periphery of the unit cover 30. The untreated oil then passes through the filter element cover opening 68 for cleansing by the filter material (not shown) in the usual manner. The treated oil then passes into the filter element sleeve 70 and exits the filter element through the top sleeve opening 72.

Referring now to FIGS. 3 and 4, the switch mechanism is illustrated comprising a conductive plunger 74 which is arranged to be vertically slideable within the vertical channel 76 of the oil outlet fitting 46. A conductive pin 78 positions at the bottom of the vertical channel 76 and is electrically insulated therefrom by the non-conductive sleeve 80. A second conductive pin 82 or other electrically conductive construction projects into the vertical channel 76 in diametrically opposed position from the first conductive pin 78. The second pin 82 connects directly into the fitting body to thereby provide a good ground connection for the electrical circuit 84 as hereinafter more fully set forth. A compression spring 86 positions within the vertical channel 76 above the top of the conductive plunger 74 and biases against the top of the vertical channel 76 to continuously urge the conductive plunger 74 downwardly into contact with the opposed pins 78, 82.

The plunger 74 is formed to a diameter slightly less than the diameter of the vertical channel 76 so that oil pressure generated within the automative transmission 10 will act through the tubing 18 and against the bottom of the plunger 74 to urge it upwardly out of contact with the conductive pins 78, 82 against the bias of the compression spring 86. Most transmissions presently in use optimumly function at an internal transmission fluid pressure of between 15 and 20 pounds per square inch. Thus, a compression spring 86 must be chosen having suitable characteristics to permit the plunger 74 to elevate out of contact with the pins 78, 82 by compressing the spring under normal operating conditions. A spring may be chosen to function upon drop of the normal operating pressure to a predetermined low level, for example 8 pounds per square inch, to thus urge the plunger 74 downwardly within the vertical channel 76. Upon occurrence of pressure low enough to cause downward motion of the plunger through bias of the compression spring 86, the bottom of the plunger 74 will downwardly move to contact the conductive pin 78 and simultaneously contact a ground connection, for example the second conductive grounded pin 82. In this manner, an electrical circuit will be completed between ground and conductive pin 78 upon occurrence of low fluid pressure within the system.

Referring now to FIG. 5, an electrical circuit 84 is illustrated in simple series manner including a conventional automobile battery 88 which supplies low voltage electrical current to the circuit to power the monitor lamp 90 in well known manner. The battery current terminates at the insulated conductive pin 78. Similarly, a ground connection 82, which may be a second conductive pin electrically conductively positioned in the oil fitting 46, terminates near the first conductive pin 78 and completes the circuit back to the battery 88. The conductive plunger 74 bridges the gap 92 between the first and second conductive pins 78, 82 to thus serve as a switch in the circuit. Thus, when the fluid pressure within the transmission 10 is sufficient to overcome the bias of the compression spring 86, the conductive plunger 74 rises within the vertical channel 76 in a piston action to open the electrical circuit 84. See FIG. 3 Upon occurrence of low pressure within the automatic transmission 10, the bias of the spring 86 pushes downwardly upon the conductive plunger 74 against the pressurized fluid. The plunger 74 then descends within the vertical channel 76 until the bottom of the plunger contacts the conductive pin 78 and the ground connection 82 to thereby close the electrical circuit 84. Upon closing of the electrical circuit 84, current from the battery 88 flows through the lamp 90 which illuminates to give visual warning to the driver of the low pressure condition. It is contemplated that the monitor lamp 90 may be wired as to be mounted upon the usual automobile dashboard (not shown) in well known manner to thereby be readily observable by the driver of the vehicle.

We claim:

1. In a combination transmission fluid monitor and filter for use within an automobile vehicle, wherein the filter element has a cover which is equipped with an opening therethrough and an oil outlet boss engaged over the said opening, the combination of
   A. a cylindrical outlet fitting affixed to the cover at the said outlet boss, said fitting having an axially aligned, cylindrical channel,
      1. said channel communicating with the said cover opening to receive transmission fluid under pressure therethrough,
   B. a conductive pin having a portion positioned within the said cylindrical channel,
      1. said pin being insulated from the cover and channel construction,
   C. a second conductive pin projecting into the interior of the cylindrical channel,
      1. said second pin being grounded to the said cover construction;
      2. said second pin being spaced from the first pin within the channel;
   D. a conductive cylindrical plunger slideable within the said channel above the said conductive pins,
      1. said plunger being reciprocal from a circuit open position to a circuit closed position,
         a. normal transmission fluid pressure urging the plunger to its circuit open position
         b. low fluid pressure allowing the plunger to assume its circuit closed position, said plunger contacting the said pins when in the circuit closed position,
      2. said plunger having a flat bottom upon which the fluid pressure impinges for plunger operation within the channel,
      3. said plunger having a diameter slightly less than the diameter of the channel to act as a piston therein;
   E. a spring biasing between a fixed portion of the fitting and the top of the plunger,
      1. said spring being axially aligned within the channel,
      2. said spring urging the plunger to its circuit closed position upon a drop in transmission fluid pressure below a predetermined minimum; and
   F. an electrical circuit connected between the first and second conductive pins,
      1. said circuit incorporating a warning light which is activated when the plunger contacts the pins.

* * * * *